United States Patent [19]

Wiedemann

[11] 4,159,427
[45] Jun. 26, 1979

[54] APPARATUS FOR UTILIZING NATURAL ENERGIES

[75] Inventor: Hans O. Wiedemann, Sauerlach, Fed. Rep. of Germany

[73] Assignee: Messerschmitt-Boelkow-Blohm Gesellschaft mit beschraenkter Haftung, Munich, Fed. Rep. of Germany

[21] Appl. No.: 752,624

[22] Filed: Dec. 20, 1976

[30] Foreign Application Priority Data

Dec. 23, 1975 [DE] Fed. Rep. of Germany ....... 2558422
Apr. 17, 1976 [DE] Fed. Rep. of Germany ..... 26170230

[51] Int. Cl.$^2$ .............................................. H02P 9/04
[52] U.S. Cl. ........................................ 290/55; 74/572; 322/4
[58] Field of Search .............. 416/60; 322/4; 318/150, 318/161; 290/55, 44; 74/572

[56] References Cited

U.S. PATENT DOCUMENTS

| 499,780 | 6/1893 | Corning | 290/44 |
| 3,988,592 | 10/1976 | Porter | 290/53 |
| 4,035,659 | 7/1977 | Jeppson | 322/4 |
| 4,058,024 | 11/1977 | Gordon | 74/572 |

FOREIGN PATENT DOCUMENTS 2339914 2/1975 Fed. Rep. of Germany ............ 416/60

Primary Examiner—Robert K. Schaefer
Assistant Examiner—John W. Redman
Attorney, Agent, or Firm—W. G. Fasse; W. W. Roberts

[57] ABSTRACT

This apparatus stores natural energies available on and/or under the surface of the world's oceans. Such energies include solar energy, wave energy, wind energy, as well as energy stored in the heat of the sea water. The energy extracting and storing equipment is installed on a floating vessel or raft. The energy storing equipment includes flywheel type rollers or cylinders driven by electric motors energized by electric generators which in turn receive their energy from the energy extracting equipment. The flywheel type rollers or cylinders include a supporting hollow cylinder having a relatively thin wall onto which there are wound fibers impregnated or embedded in a synthetic resin.

27 Claims, 20 Drawing Figures

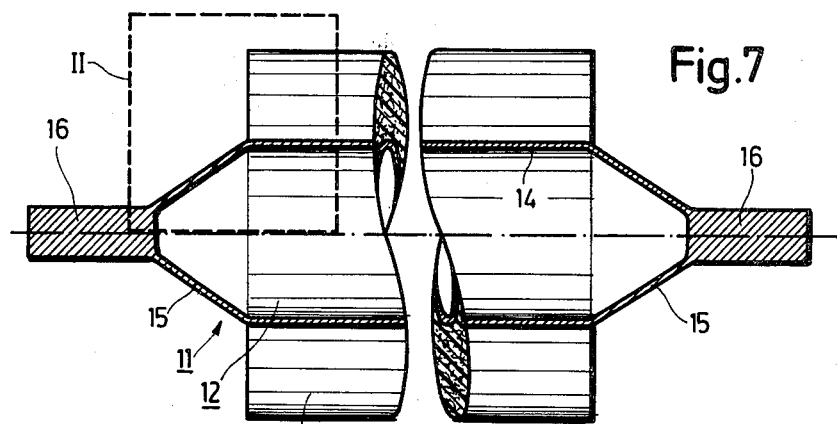
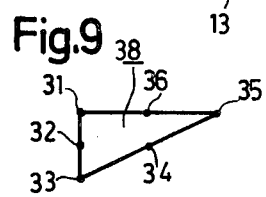
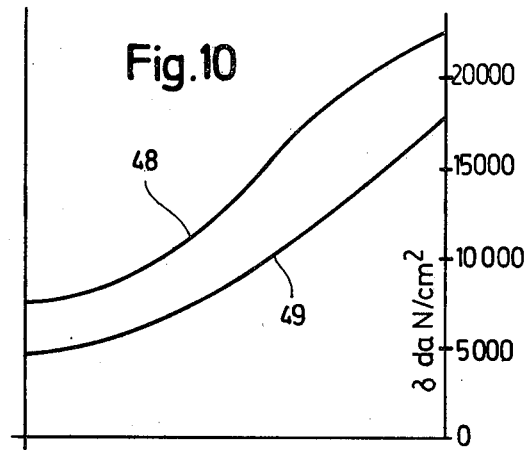
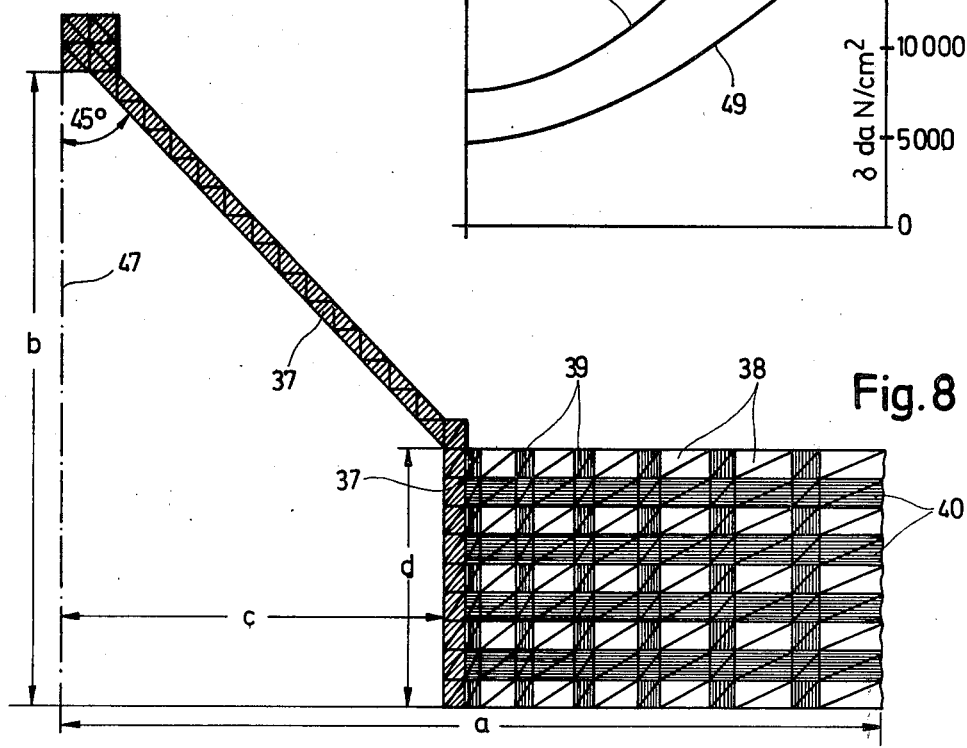

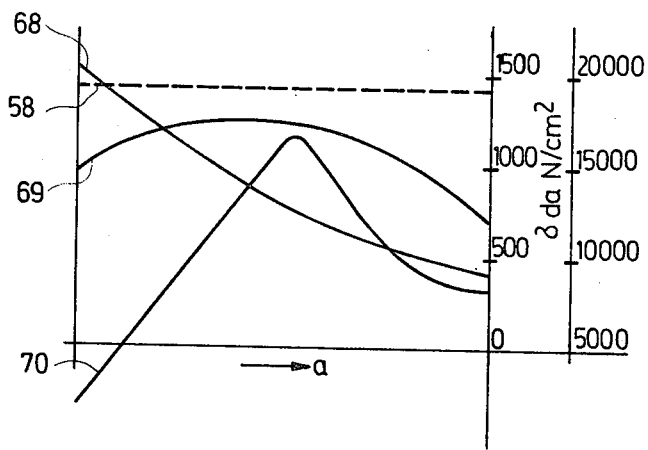
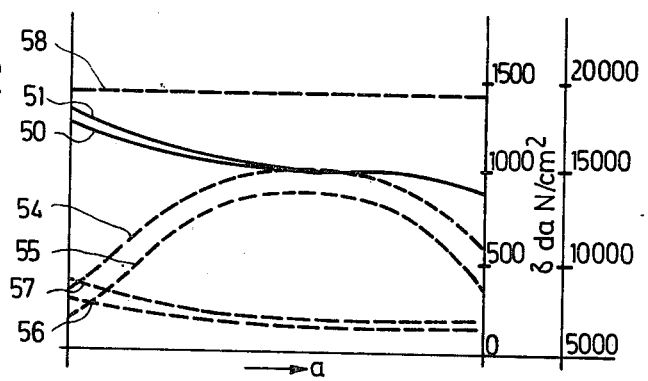
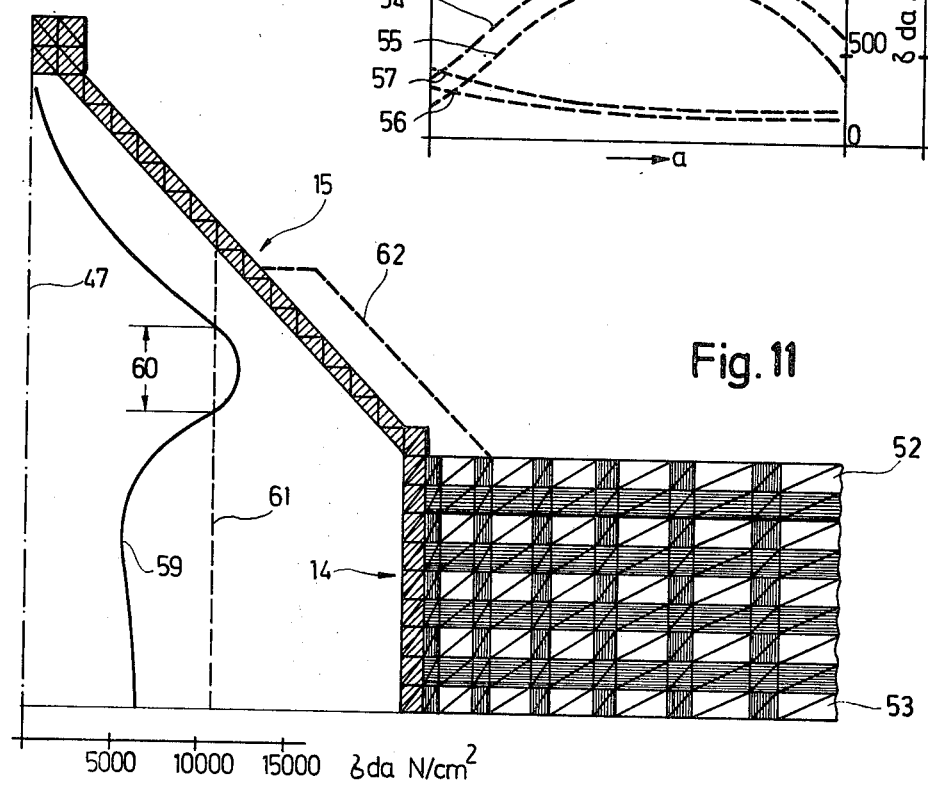

APPARATUS FOR UTILIZING NATURAL ENERGIES

BACKGROUND OF THE INVENTION

The present invention relates to an apparatus for utilizing natural energies which are available on the surface and/or under the surface of the waters of the world's oceans. The energies are stored in flywheel type energy storing facilities, which are installed in floating vessels, such as ships or rafts.

The natural energies available on the planet earth have so far been tapped only to a small extent. There are several reasons for this lack of effort in utilizing naturally available energies. One reason for not utilizing these natural energies which are generated either directly or indirectly by the sun, is seen in that the energies are not generally available in a uniform manner which is desirable for a large scale utilization in the industrialized using countries. Another reason is seen in that heretofore, there have been no satisfactory solutions for the storing and transporting of such natural energies from the global zones where they are available to the zones where they are needed and used.

Methods are known for the individual using of natural energies in a locally efficient manner. Thus, it is known to convert solar radiation either directly or indirectly into electrical energy by means of solar cells, as well as by means of so-called solar collectors which heat up liquid media for driving turbogenerators. A direct continuous utilization of solar radiation is not possible for evident reasons. However, it has been suggested to provide a substantially continuous utilization of solar energy by employing hot water containers or the like.

However, due to the required large size of the water reservoir only a limited local utilization of the solar energy is possible.

The utilization of wind energy poses similar problems. A substantially constant wind occurs only in regions of the globe which are uninhabited, especially over certain ocean regions. Further, the energy available in the wave motion of the oceans has remained substantially completely unutilized. Similarly, the temperature differences at different depths in the oceans have also not been utilized to any extent worth mentioning. This applies also to the temperature difference between the air and the ocean waters. This is so, although such energies residing in the temperature difference could be used economically by means of heat pumps having a well established efficiency.

Large scale energy storing devices are presently available only in the form of water reservoirs or pumping stations. The storage of electrical energy in electrochemical batteries is so far possible only on a rather small scale if efficiency or economy is taken into account. Even flywheel type rollers and cylinders are used on a small scale for the storing of energy, although the principle has been well tested for some time now and although such flywheel type storage means have been economically used in vehicles. It has been found to be possible to achieve high energy densities and small weights by using high strength, synthetic resin impregnated fibers for the manufacturing of the flywheel type cylinders which are thus highly suitable for flywheel type energy storage devices.

OBJECTS OF THE INVENTION

In view of the above, it is the aim of the invention to achieve the following objects, singly or in combination:
  to provide an apparatus which is capable of an economic utilization of the natural energies available on the surface of the world's oceans and in the ocean's waters;
  to construct an apparatus in such a manner that it is capable to store the energies such as solar energy, wind energy, wave energy and temperature difference energy in regions where these energies are freely available and to transport the stored energy to the regions where they are needed and used;
  to equip a floating vessel with wind operated rotors, with wave energy operated pumps, as well as with solar cells and/or solar collectors, and with heat pumps which utilize the temperature difference between the air and the oceans' water and/or between different depths in the ocean water;
  to extract, store and transport naturally available energies in a manner which will not adversely affect the environment; and
  to construct a flywheel type of energy storage device in such a manner that high energy densities are achieved while simultaneously minimizing the weight of the flywheel type storage device.

SUMMARY OF THE INVENTION

According to the invention there is provided an apparatus for the utilization of natural energies comprising at least one floating body equipped with electric generators which are operated by devices for producing solar energy, wave energy, wind energy and/or heat energy extracted from the oceans' heat. The electrical generators drive motors which in turn drive flywheel type energy storage devices built into the floating bodies, such as a ship, or raft, or the like. The flywheel type energy storage devices are equipped with a flywheel type roller or cylinder comprising a hollow cylinder having a thin wall forming a supporting body onto which there are wound fibers impregnated with a synthetic resin.

According to a further embodiment of the invention the water craft comprises two floating bodies arranged in catamaran fashion and interconnected by a platform which is either rigidly or releasably secured to the floating bodies. If desired, a larger number of floating bodies may be combined in this form, for example, in trimaran fashion or in the form of a raft.

The invention thus provides a universally useful device for converting and using all types of energy available on the surface of the oceans and/or in the waters of the oceans. The water craft, according to the invention, is capable to be used, by reason of its equipment, as an energy collector at points on the globe which are especially suitable for that purpose or it may be utilized as an optimal energy collector while enroute, it may further be used as an energy transporter. For example, if a vessel according to the invention, travels from Europe to the equator, its heat pumps will collect energy mainly from the heat of the water in tropic and subtropic oceans. On the way south the energy intake from solar radiation will not be too large. However, when the vessel reaches the Tropic of Cancer the proportion of collected solar energy will be substantially increased during the summer months and the efficiency of the heat pumps will also be increased due to the substantially vertical direction of the solar radiation. An advantageous energy storage is also possible from the heat of the oceans' waters when travelling between the Tropic of Cancer and the Equator. In addition, it is possible during the entire journey to collect wind and wave energy. In this manner the energy extraction and storage may be optimized. When an energy storing flywheel is fully charged the so stored energy may be either transferred to another flywheel energy storage device, or the water craft travels back to its home port utilizing the collected energy for the purpose. In the alternative, such vessels may also travel to closer ports where the stored energy may be supplied into customary electrical power supply networks. A fleet comprising a sufficiently large number of such vessels would be capable to supply a substantial proportion of the electricity requirements of the entire world without any detrimental environmental impact whatsoever. The vessels, according to the invention, are provided with solar cells for the direct transformation of solar energy into electrical energy. Simultaneously, or in the alternative, the vessels may also be provided with collectors for the solar energy, in which a suitable liquid is heated, which in turn drives a generator through a steam turbine. The wave energy is utilized by driving pumps by means of floating bodies. The pumps transport sea water into elevated water containers and the water flowing out of these containers drives water turbines which in turn operate the electrical generators. Similarly, wind energy is utilized by wind driven rotors, which in turn drive respective generators.

As mentioned above, the energy conversion of the heat stored in the sea water is accomplished by heat pumps, the heat exchangers of which are submersible into the surface waters of the ocean, whereas the cooling means may be lowered into deeper water layers by means of tubular masts. In this type of conversion again the heat extracted from the sea water heats a medium suitable for operating a turbine, which in turn drives a generator. According to a modification, the invention suggests that the cooling means supported by the tubular masts in the sea water are employed for the transmission of the sea water heat to the medium of the heat pumps, whereas the heat exchangers are used as air coolers where the air temperature is substantially lower than the temperature of the sea water. According to a further feature of the invention, the tubular masts, which are preferably arranged alongside the outer edges of the decks or platforms of a vessel are also used to support the wind driven rotors at the upper ends thereof, whereas the lower ends support said coolers.

While the individual elements for the extraction of naturally occurring energies are well known, the gist of the invention resides in the combination of the known energy extraction techniques with a flywheel type of energy storage device in a floating vessel, whereby it has become possible for the first time to develope large natural energy sources in an efficient manner which simultaneously protects the environment.

The flywheel type energy storing device is constructed according to the invention, to comprise a supporting body formed as a thin wall hollow cylinder, the length to diameter ratio of which is at least 1. Intermediate members preferably having the shape of a cone are secured to the hollow cylinders to carry journal or bearing pins. The supporting body has would thereon a flywheel type of cylinder or roller made of fibers, preferably fibers impregnated with synthetic resins, whereby the fibers have an elasticity or stress characteristic substantially corresponding to that of the supporting body. According to a preferred embodiment of the flywheel type energy storage device, the hollow cylinder is provided with axially extending slots which reach into the intermediate members.

The following features contribute to the very desirable operational characteristics and to the long durability of the energy storing devices according to the invention. Thus, the geometric configuration of the supporting bodies corresponds substantially to the shape of a bobbin or drum which has been found to be very suitable for the intended purposes.

Furthermore, the fiber threads are substantially evenly distributed over the surface of the supporting body or drum. This also applies to the distribution of the synthetic resin. These features provide the energy storing device with desirable operational characteristics and a long operational life which has been supported by extensive calculations, as will be described in more detail below.

The invention departs intentionally from the conventional construction by flywheel energy storage devices, thereby overcoming the prejudice heretofore expressed by those skilled in the art to the effect that the flywheel cylinders must have a diameter as large as possible while simultaneously having a narrow length or width. The invention also departs from the prior art teachings that flywheels are supposed to be constructed from different materials from the inside out, in order to produce large storing capacities. Heretofore it was customary to make flywheels from different material combinations having different characteristics in order to achieve large storing capacities and efficiencies. According to the invention it has been found that these teachings do not result in the most efficient flywheel energy storing devices.

Prior art structures of flywheel cylinders made of fiber reinforced synthetic materials and comprising large diameter storage housings have severe disadvantages, especially due to the hardly controllable gyro moments. The invention has completely eliminated these disadvantages due to the surprisingly simple structure of the flywheel type energy storing device, the individual components of which are completely controllable when designing such devices as well as when constructing such devices. The supporting body for the present energy storing device constitutes a beam subjected to bending. Said beam, due to its structure is efficiently capable of transmitting the forces and moments which occur at the journal or bearing pin, onto the bearings. This is so, because the bearing pins are provided with an adequate base. Moreover, it is possible to keep the force couples resulting from gyro moments, small by the large spacing between the bearing pins and by transmitting these forces, for example to ball bearings, in the same manner as has been done heretofore in connection with the rotor of high rpm aircraft turbines. The energy losses due to bearing friction may be further reduced by using magnetic bearings which may be especially desirable in long duration energy storage devices. The intermediate members between the storing cylinder proper and the bearing pin are, as mentioned above, preferably hollow cones which have the advantage that the load distribution at the ends of the supporting or carrier body, corresponds substantially to the respective distribution in the center of such bodies.

According to the invention, the winding, especially fiber windings, may be arranged only on the cylindrical portion of the supporting body of the flywheel type cylinder or these windings may also be arranged on the intermediate or transitionary member between the cylinder proper and the bearings. By this feature, in combination with the selection of the materials of which the flywheel type of storage device is made, it is possible, according to the invention to maintain the tangential or circumferential and radial stresses in the supporting body and in the flywheel type cylinder below the ultimate stress or strain. A further advantage of the invention is seen in that the flywheel type cylinders may be manufactured of homogeneous, impregnated fiber threads, whereby winding practices may be employed which are well known, for example, in connection with the production of pressure containers.

The invention solves the cooling problems in a surprisingly simple manner by making the transitionary or intermediate members and the bearing pins hollow, whereby a fluid such as a cooling liquid may be retained in the hollow spaces and may flow through these hollow spaces, whereby the further possibility is provided that the cooling liquid may simultaneously be employed for the additional storage of kinetic energy.

BRIEF FIGURE DESCRIPTION

In order that the invention may be clearly understood, it will now be described, by way of example, with reference to the accompanying drawings, wherein:

FIG. 7 illustrates the simplest form of a fly-wheel type energy storage device partially in section, whereby a center portion of the storage device has been cut out to adapt the illustration to the size of the drawing sheet;

FIG. 8 illustrates a mathematical model for ascertaining the stress distribution in the supporting bodies and in the flywheel type of roller or cylinder;

FIG. 9 illustrates an enlarged element of the mathematical model according to FIG. 8;

FIG. 10 shows the stress characteristic curve of a control calculation of checking a computer program;

FIG. 11 illustrates a mathematical model corresponding to FIG. 8 with a stress curve of the supporting bodies;

FIG. 12 illustrates stress curves in the flywheel type roller or cylinder of the flywheel storage device according to FIG. 7;

FIG. 15 illustrates the stress curves in the flywheel type cylinder of the storage device according to FIGS. 13 and 14;

Figure 19:
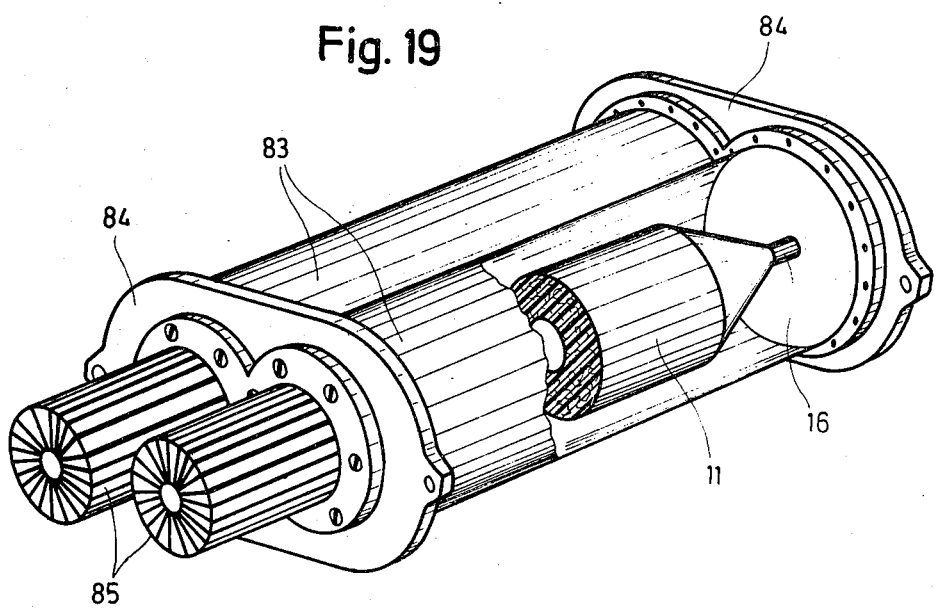
Figure 20:
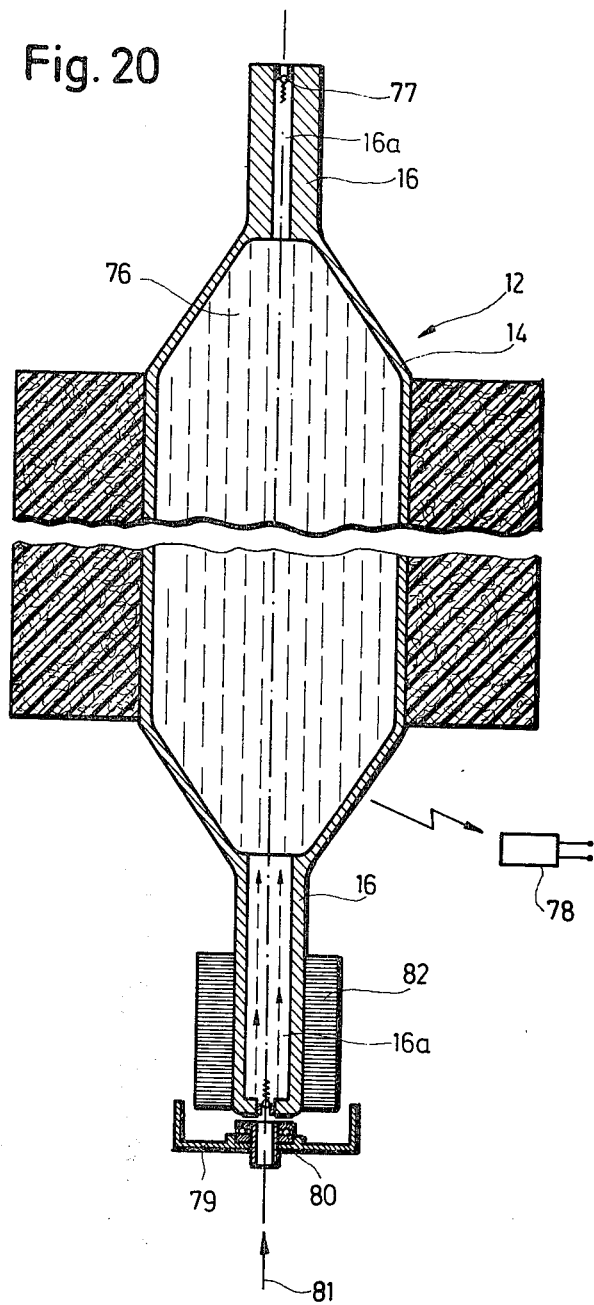

FIG. 19 shows a structural unit of two energy storing devices according to the invention arranged for rotation in opposite directions; and FIG. 20 shows a sectional view through an energy storing device according to the invention and similar to the illustration of FIG. 7 with the further feature that a cooling medium such as a cooling liquid, may be received inside the hollow space of the supporting body of the storing device.

DETAILED DESCRIPTION OF PREFERRED EXAMPLE EMBODIMENTS

Figure 1:
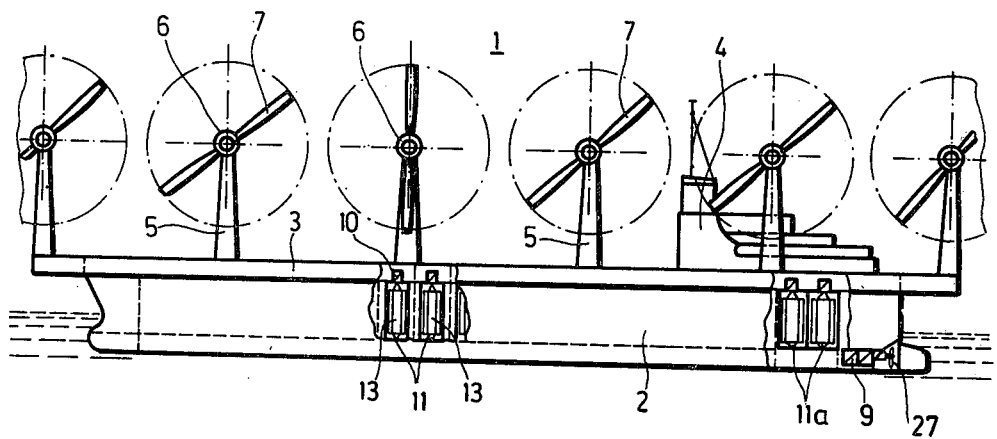
FIG. 1 illustrates a side view of a water craft according to the invention, including a platform or deck carrying wind driven rotors and devices for the utilization of solar energy.
Figure 2:
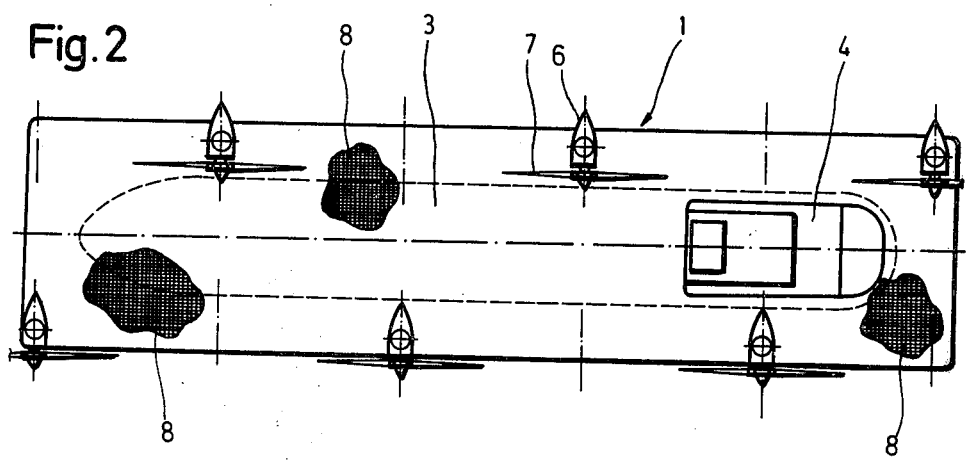
FIG. 2 illustrates a top plan view of the craft according to FIG. 1.

The water craft 1 according to the invention comprises a floating body 2 as shown in FIG. 1 supporting a deck or platform 3 as shown in FIGS. 1 and 2. Super structures 4 are arranged on the deck 3 including the facilites for operating the ship as well as quarters for the crew. Masts 5 are mounted alongside the deck 3. The masts carry generators 6 in respective housings at the top of the masts. The generators 6 are driven by wind rotors 7 and the housings of the generators 6 are rotatable at the top of the masts in a known manner so that the rotors may be always brought into the proper direction for a most efficient utilization of the wind forces.

The top surface of the deck 3 is covered with solar cells 8 to the largest possible extent, three groups of solar cells 8 are shown in FIG. 2. The freight or storage space is completely filled with flywheel type energy storing devices 11. Hereafter these flywheel type energy storing devices will simply be called storing devices. Preferably, the storing devices are arranged in the body of the ship or raft so that the rotational axes of these storing devices extend vertically. The storing devices are operatively connected with their upper ends to motor-generators 10 which drive the storing devices 11 with their storing cylinders 13 for storing energy and which are driven by these storing devices 11 in order to deliver energy.

Further energy storing devices 11a are arranged in the stern of the floating body 2. These devices 11a drive the ships propellers 27 through electro-motors 9. As mentioned, the storing devices 11 and the rollers or cylinders 13 rotating therewith are driven through the wind rotors 7 or through the solar cells 8 which energize the respective motor-generators 10.

The solar cells 8 may also be replaced in a manner known as such by solar collectors which provide the necessary solar energy to heat a liquid which in turn is used for energizing a steam turbine driving a generator and through the generator the motor-generator unit 10. Preferably the rollers or cylinders 13 rotate in an evacuated space or housing. The weight of the cylinders 13 is balanced at the upper end by magnetic axially effective bearings. In this type of arrangement the energy storing devices are capable of running, or rather, rotating for about six months without any substantial reduction in the rpm.

The arrangement of FIGS. 1 and 2 with its illustrated internal and super structures serves as energy collector as well as an energy transporter. The energies required for driving the entire apparatus from a location where the energies are collected, for example in the Atlantic, to a home port, are so small relative to the total stored energy that it is actually possible to increase the stored energy even during the home run. In other words, the apparatus is capable of storing energy while simultaneously using some of the energy being collected for its own advance and for its own operation. The energy stored in the devices 11 are extracted either in the home port or in any other suitable anchoring locations by connecting the motor-generator units 10 through conventional switching and transformer equipment to an electrical power supply network. Presently idle tanker ships could be converted to a craft 1 as described above, with relatively small expenditures, whereby energy might be recovered and simultaneously foreign currencies saved. The present vessels or rafts have yet another use, namely in the transporting of energy from locations of future large scale energy production facilities to places of energy consumption. Such large scale facilities would be located in areas on the globe especially suitable for the purpose. Such locations are normally remote from the places of consumption.

Figure 3:
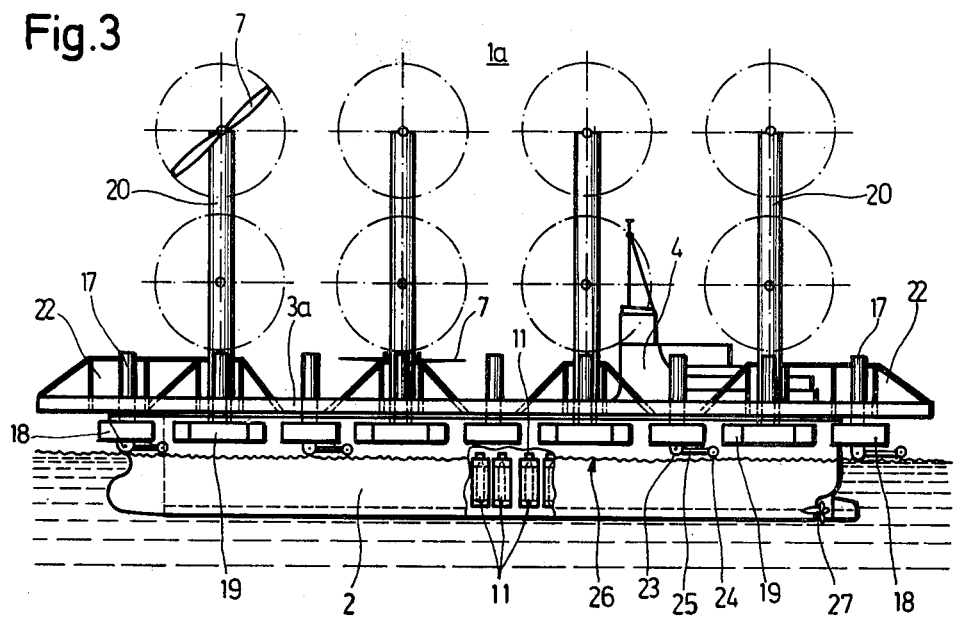
FIG. 3 illustrates a side view of a water craft including equipment for the utilization of the heat contained in the sea water, for the utilization of solar radiation as well as wind and wave energy.
Figure 4:
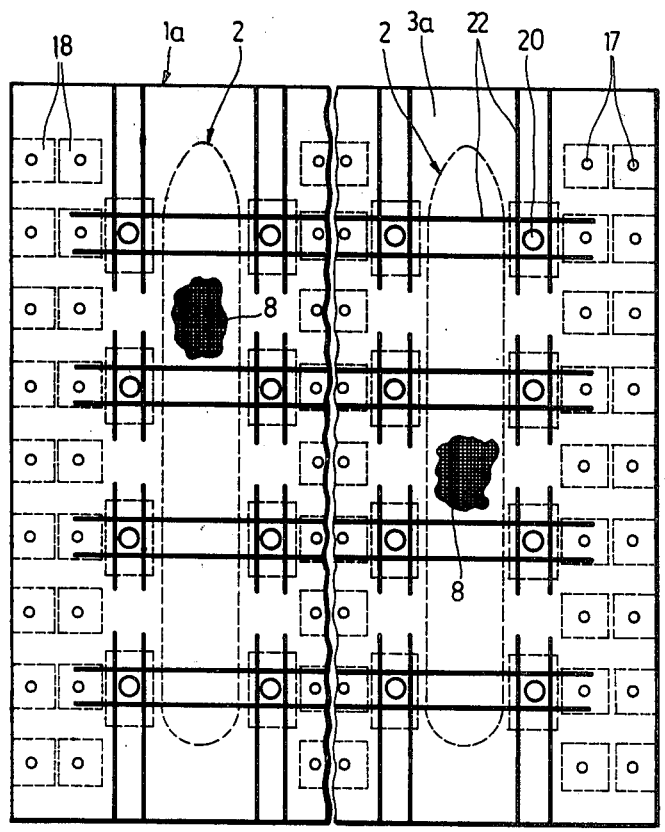
FIG. 4 is a top view onto the craft according to FIG. 3 which includes two floating bodies operatively connected to each other.
Figure 5:
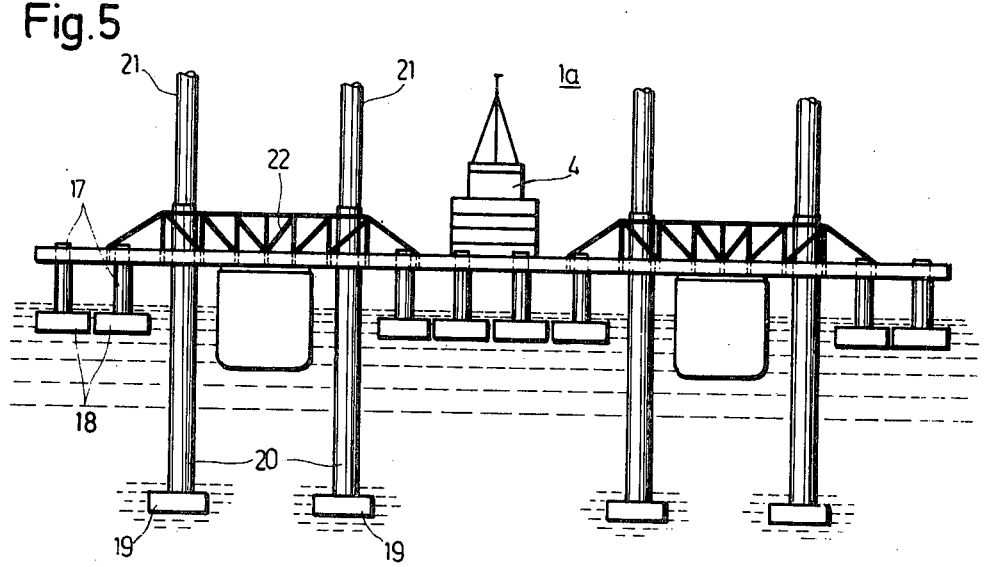
FIG. 5 is a schematic rear view of a craft according to the invention, as illustrated in FIGS. 3 and 4, whereby the equipment for using the heat in the sea water is shown in the operative position.

FIGS. 3 to 5 illustrate a water craft 1a comprising two floating bodies 2 arranged in catamaran fashion and interconnected with each other by a platform or deck 3a extending across and beyond the two floating bodies 2. The deck super structures 4 are located centrally of the craft 1a. As in FIGS. 1 and 2, the internal space of the floating bodies 2 will receive the storing devices 11 as well as the energy transforming motorgenerator units 10 and the driving means for the propellers 27. The water craft 1a is equipped with the wind rotors 7 as well as with solar cells or collectors 8 and with devices for the utilization of the sea water heat and of the wave energy. The sea water heat is utilized by means of heat pumps which extract in a known manner heat from the sea water to heat a medium which in turn drives a generator through a turbine. The generator in turn energizes the motor part of the units 10 to drive the energy storing device 11. The heat pumps cooperate with two different heat exchangers and coolers 18, 19. One type comprises heat exchangers 18 secured to pipes 17 and distributed over the entire deck of the craft. As shown in FIG. 5, the heat exchangers 18 are lowered into the warm surface water layer of the ocean during their operation. The other type comprises cooler heat exchangers 19 supported by long pipes or tubular masts 20 by means of which the coolers 19 may be lowered into deeper, cooler layers of the ocean. If desired, to utilize larger temperature differences, the coolers 19 may be lowered to larger depths since the tubular masts 20 are extendible by means of additional pipe sections 21. The tubular masts 20 may also serve at their upper end as carriers for wind rotors 7 where it is not intended to utilize the energy of the sea water heat. In order to strengthen and support the tubular masts 20 and possibly also the pipe sections 21, frame structures 22 are arranged on the deck 3a. These frame structures are capable to support the rotors 7 even if the tubular masts 20 are lowered.

The craft 1a is suitable, for example, for utilizing high wind and wave energies during the fall and winter season in the North Atlantic. This has the additional advantage that a short travel distance to the point of energy collection is involved from most European ports. In this type of utilization, the heat pump equipment may be operated in another way when the sea water temperature is still about 10° to 15° C. and the air temperature is approximately 0° C. or lower. In this type of operation the heat exchangers 18 are not lowered into the sea water but serve as air coolers and the heat exchangers 19 are lowered to a depth having the highest water temperature. In this type of operation the heat exchangers 19 transfer the heat of the sea water to the liquid medium of the heat pump.

Wave generators 23 utilize the wave energy. The wave generators 23 may, for example, be secured to the heat exchangers 18. These wave generators 23 comprise spherical or cylindrical floats 24 secured to the outer ends of hinged outriggers 25. The waves 26 move the floats 24 up and down and this up and down movement is transmitted to piston water pumps not shown which elevate sea water into containers secured to the upper ends of the pipes 17. The water flows uniformly out of these containers to drive water turbines arranged at the lower ends of the pipes 17. These turbines in turn drive generators which energize the motors of the units 10 to thereby drive the storing devices 11. By adjusting the vertical position of the pipes 17 it is possible to place the wave generators 23 in an optimal position relative to the wave amplitudes and wave frequencies of the ocean surface.

Figure 6:
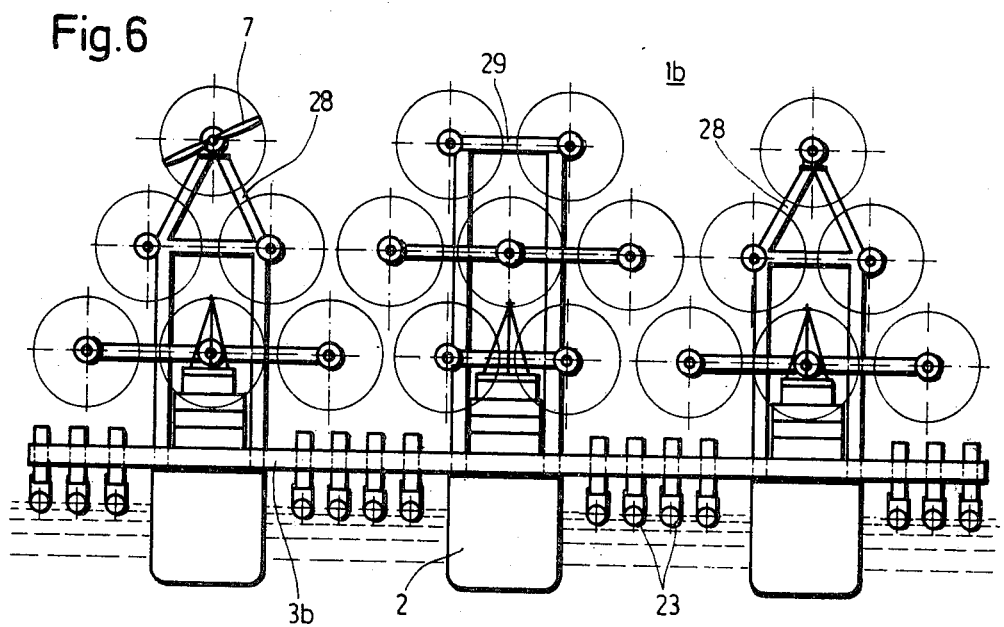
FIG. 6 shows a rear or front view in a schematic manner similar to that of FIG. 5 but illustrating three floating bodies interconnected to form a raft carrying a plurality of wind rotors as well as wave generators.

FIG. 6 illustrates another type of water craft 1b in which three floating bodies 2 are covered and interconnected by a deck or platform 3b to support a large wind and wave power station, especially constructed to be used in regions with high wind speeds. For this purpose two tubular frame structures 28 are supported on the two outer floating bodies. Each outer frame structure 28 supports six wind rotors 7 whereas the frame structure 29 supported on the centrally located floating body carries seven wind rotors 7. In addition, a plurality of wave generators 23 are distributed over the deck 3b outside the floating bodies 2. Furthermore, and depending on the particular requirements, solar cells or solar collectors as well as heat pumps may be installed in the structure of FIG. 6 as has been described above with reference to the preceding figures. The floating bodies 2 having installed therein the energy storing devices 11 may be floated into position below the deck 3b and are connected to the deck, for example, during the charging time of the storage devices 11. Such connecting means are well known in the art. Upon completion of the charging of all of the storing devices 11 in a floating body 2, the latter again leaves the platforms 3b to return to their home or delivery ports. The wind rotors may be utilized during the journey for supplementing or replenishing the energy losses due to propelling the floating bodies and due to frictional losses. However, it is possible to lock the wind rotors in a fixed position if desired, to minimize drag. From the foregoing, it will be appreciated that the platform structures 3b may be anchored in permanent positions where the energy extraction conditions are favorable so that different collecting vessels may shuttle back and forth between these anchored platforms and their delivery ports.

A suitable location for anchoring platforms to be used by the vessels 1b is, for example, the area near the Orkney Islands in which the average annual wind speeds are about 8.0 m/second. Wind driven power stations in this area would have an output about 4.6 times larger compared to a similar station operating, for example, in the vicinity of Hamburg, Germany, where the average annual wind speed is only 4.8 m/sec. Assume the following: the average wind speeds are 8.0 m/sec, twenty rotors 7 are utilized each having a diamter of about 60 m, wave generators with floating bodies 24 are used which have a total weight of twenty thousand tons, and the wave generators are operating at an average wave amplitude of 2 m. Under these assumptions an average annual power of about 150 megawatts (MW) could be produced and stored.

FIG. 7 illustrates one of the most simple embodiments of a storage device 11 according to the invention, comprising a flywheel type roller or cylinder 13 supported on a carrier body 12. The carrier body 12 comprises in its center portion, a hollow cylinder 14 and each of the ends includes a transitionary or intermediate member 15 with a journal or bearing pin 16. The intermediate members 15 are secured to the center portion by conventional means. The cylinder 13 is made of synthetic resin impregnated fiber threads which are wound onto the carrier body 12 by conventional coil winding methods. After the winding the structure is cured, for example, in an autoclave. The overall structure of the flywheel type energy storing device 11 has an elongated coil shape including a large base for the bearing pins 16. Such a large base is accomplished in the embodiment of FIG. 7 in that the hollow cylinder 14 has a length corresponding at least to its diameter and preferably the length is larger than the diameter, and the intermediate members 15 are constructed as hollow cones. This type of coil shape is further emphasized in that the roller 13 proper has a diameter corresponding only to twice the diameter of the hollow cylinder 14.

Taking the foregoing criteria into account when designing and manufacturing the storing devices 11, one will select the materials for the supporting or carrier body 12 and for the flywheel type cylinder 13 in accordance with their suitability and their compatibility. The best operational characteristics are achieved if the materials for the carrier body 12 and for the flywheel type cylinder 13 have substantially the same strain factor. These materials should also have the same ultimate strain factor. The foregoing conditions should be met because the largest tangential or circumferentially effective ring stress in the fiber material is effective in the inner winding of the cylinder 13 in contact with the carrier body 12. The foregoing conditions are met, for example, by high strength titanium alloys and preimpregnated carbon fibers hereafter referred to as carbon fibers. The resin used for the impregnation of the carbon fibers must also meet these high load requirements or characteristics while simultaneously having a sufficiently high strength.

For examining the stress conditions occurring in these storing devices and for developing the shapes according to the invention, modern electronic data processing means were used, including so-called "finite-elements-programs". For this purpose the respective NASTRAN of the National Air and Space Administration (NASA) was utilized which includes a triangle element TRIAX-6 of rotational symmetry. This type of element is suitable to completely and precisely analyze all structures of rotational symmetry. The embodiment of FIG. 7 was developed out of a series of such examinations. In order to perform the NASTRAN program it is sufficient if the flywheel type energy storing device is symmetrically constructed. In that instant an analyzation of the cut out or segment II in FIG. 7 is sufficient for the stress analysis or calculation. This segment II is illustrated in FIG. 8 as a "finite-element-model" in which the fibers, the resin and the carrier body are illustrated in an idealizing manner by means of differently marked TRIAZ 6-elements. The TRIAX 6-elements 37 with a 45° hatching represent metal parts. The elements 38 shown without any hatching represent fibers. The vertically hatched elements 39 represent the binder resin and the horizontally hatched elements 40 represent the separation resin. One of the TRIAX 6-elements 38 is illustrated on an enlarged scale in FIG. 9 and this enlarged element 38 represents the other elements 37, 39 and 40 as well. The enlarged element of FIG. 9 comprises six element nodal points 31–36 at which the stresses are ascertained. For performing the calculations a model corresponding to FIG. 8 was selected with the following dimensions:

a = 300 mm; c = 140 mm
b = 220 mm; d = 90 mm.

In this illustration of FIG. 8 the dimensions a and c are longitudinal dimensions along the length of the rotational axis, whereas the dimensions b and d are radii extending from the rotational axis of the storage device. It is further taken into account that the flywheel type roller comprises a fiber proportion of 67% and a resin proportion of 33%. In order to test the NASTRAN program and to confirm the assumptions made, a test calculation for the tangential or hoop stresses was performed in which the resin values were replaced by values for rubber, in which case the elasticity modulus E is practically equal to zero. The following materials and their characteristic values have been used or inserted in the calculation:

Carrier body of titanium (element 37) having an elasticity modulus of $E=1.1\times10^6$ daN/cm$^2$, $\gamma=4.50$ g/cm$^3$, $\delta$ult. = 11,000/daN/cm$^2$;

carbon fibers (element 38) having an elasticity modulus of $E=1.9\times10^6$ daN/cm$^2$, $\gamma=1.74$ g/cm$^3$, $\delta$ult. = 24,000/daN/cm$^2$; and rubber (elements 39 and 40) having an elasticity modulus of $E=211$ daN/cm$^2$, and a specific gravity of $\gamma=1.14$ g/cm$^3$.

The calculation performed with the NASTRAN program for an rpm n=33,000 rpm resulted in the cruve 48 shown in FIG. 10. Due to the fact that in this calculation the elasticity modulus for rubber was used instead of the resin, and because this elasticity modulus is substantially zero, it was possible to very well test the curve 48 by a comparing calculation according to the known formula: $\delta = 1.w^2.R^2$ and in which the tangential stress in a single ring fiber was calculated. The test calculation is shown in curve 49 and in FIG. 10. It will be noted that curve 49 extends substantially in parallel to curve 48, thereby proving the correctness of the NASTRAn program.

The higher values of the curve 48 as actually measured in the test, account for the fact that the mass of the rubber enters into the calculation.

FIG. 11 shows an idealized "finite-element-model" of the same type as in FIG. 8. FIG. 12 positioned above FIG. 11 shows the stress characteristic curves resulting form the NASTRAN program for an actual embodiment of the flywheel type cylinder according to FIG. 7. In FIG. 12 the characteristic values for the following materials have been taken into account:

Titanium carrier body of TI-6A6-6V-ZSN;

carbon fiber of HYFIL 2,730 (made by Rolls Royce); both having material characteristic values as set forth above for FIG. 10;

synthetic resin Erla 4617/DDM (manufacturer Union Carbide) having an elasticity modulus of $E = 48,200$ daN/cm$^2$, $\gamma = 1.24$ g/cm$^3$, $\delta$ult. $= 1,310$ daN/cm$^3$.

The synthetic resin has a failure load or break stress of 6%. Although the elasticity modulus of the synthetic resin is only about 4% of that of the carbon fiber, very high radial stresses occur in the resin during the operation of the storing device. These high radial stresses require the use of this very high quality resin which has a stress strength and a break-down strength corresponding to two to three times the respective values for ordinary epoxy or phenolic resins with a comparable elasticity modulus E. Referring to FIG. 12 the stress curves calculated with the aid of the NASTRAn program for an rpm of 33,000 will now be explained. The curves 50 and 51 illustrate the tangential or ring stresses for the carbon fibers in the upper and lower row of the TRIAX-6-elements 52 and 53. The curves 54 and 55 show the radial stresses of the synthetic resin in the rows 52 and 53. The curves 56 and 57 illustrate the tangential stress characteristics for the synthetic resin also in rows 52 and 53 of the TRIAX-6-element. The ultimate strength of the resin is shown by the straight line 58.

Similar values are obtained for carbon fibers having high elasticity moduli and higher strengths. FIG. 12 shows that the rpm may even be increased without reaching the ultimate strength of the resin. The upper limit for the indicated ultimate strength is above 40,000 rpm. FIG. 12 further shows that the ultimate strength of 24,000 daN/cm$^2$ of the carbon fibers is not at all fully utilized. Thus, if synthetic resins should be developed having a still higher ultimate strength, then it would be possible to correspondingly increase the rotation of the storing devices to still higher rotational speeds. The present calculation as well as the experiences and tests made with the preimpregnated carbon fibers support the expectation that the storing device according to the invention will properly operate. Especially, it is substantially impossible that the several layers of the flywheel type cylinder will delaminate or separate from the carrier body so that a long operational life may be reasonably expected for these cylinders.

In FIG. 11 the rotational axis 47 of the storing device constitutes the abscissa and the figure illustrates the tangential stresses 59 occurring in the hollow cylinder 14 and in the intermediate member 15, whereby the same values have been assumed as discussed above with reference to FIG. 12. It will be seen from FIG. 11 that in the sectional portion 60 of the stress curve, the ultimate strength 61 of the titanium has been exceeded. Accordingly, it is necessary to reinforce this portion of the intermediate member 15. Preferably this may be accomplished effectively by an additional winding as illustrated by the dashed lines 62.

The tangential stresses are further influenced by the material of which the carrier body is made. Where the material has a higher specific gravity, such as steel, naturally substantially higher tangential stresses will occur in the inner fibers than do occur in the titanium. In the present instance, where a steel carrier body is mentioned as an example, it would be necessary to either employ lower rpms, or to further reinforce the intermediate member 15 or to employ an altogether different overall configuration.

Comparing the embodiment of the invention, as described with reference to the preceding figures, and including a carrier body 12 of titanium and a flywheel type cylinder 13 of preimpregnated carbon fibers with a flywheel made of high strength steel laminations, shows that the energy to weight ratio is about six times better in the embodiment of the invention than in the laminated steel flywheel.

The just discussed optimization is rather expensive at this time, however, this is not considered to be a drawback in view of the soaring energy costs and in view of the further fact that intermediate solutions are also available. For example, it is possible to make the carrier body of high strength steel and to use S-type glass fibers or fibers of aromatic synthetic materials (Aramids) such as Kevlar 49. Such an embodiment will still provide an energy to weight ratio which is about four times better than that of a conventional steel flywheel with the further advantage that the costs for producing such an energy storing device with a steel carrier body and S-type glass fibers are approximately only 1/10th of the cost for an embodiment with a titanium supporting body and carbon fibers. As mentioned above, and as may be seen from the curves 50 and 51 in FIG. 12, it is necessary to use material combinations in which the yield and ultimate strains of both materials are about equal in order to fully utilize the fiber material and because the largest tangential or ring stresses occur in the fiber material at the inner winding that is, adjacent to the carrier body. The just made statement applies to the material combination titanium and carbon fibers. However, the corresponding values for the material combination steel and S-type fiber-glass vary considerably, especially since S-type fiber-glass has an elasticity modulus of only 740,000 daN/cm$^2$. The ultimate strain of S-type fiber-glass is thus many times larger than that of steel and also of titanium, whereby the supporting body might break well before the ultimate strength of the S-type glass fibers is reached.

Figure 13:
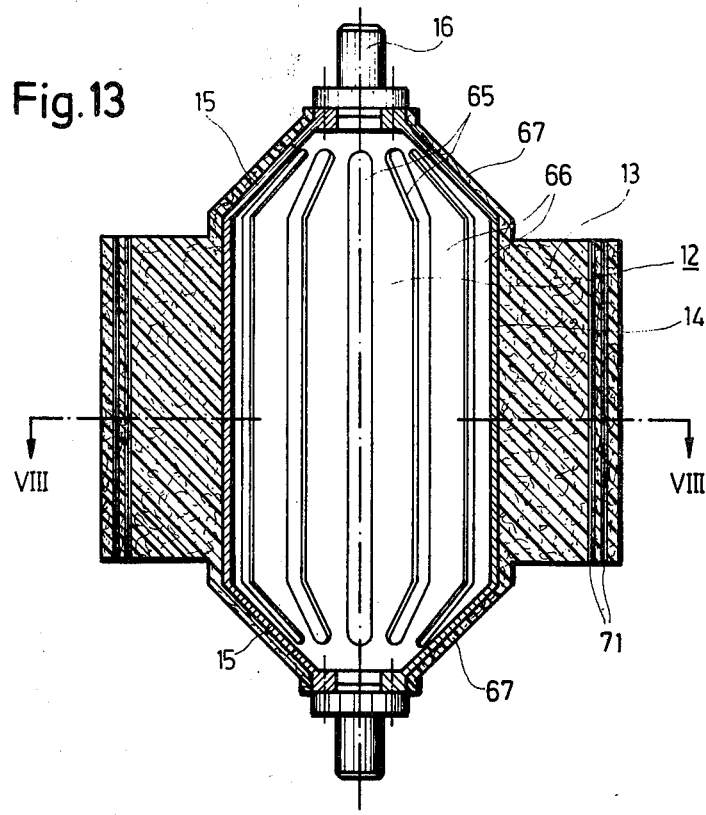
FIG. 13 is a flywheel energy storing device including a slotted supporting body and intermediate or transitionary member constructed as hollow cones.
Figure 14:
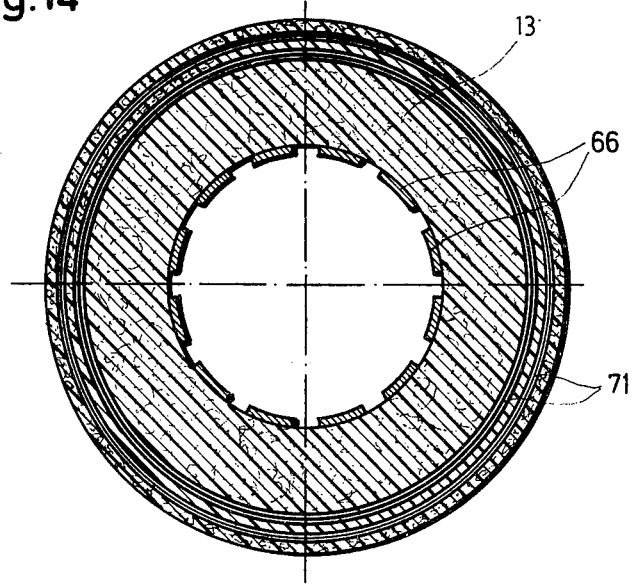
FIG. 14 illustrates a section along the section lines XIV—XIV in FIG. 13.

In view of the foregoing it is suggested to construct the energy collecting device in accordance with the embodiment of FIG. 13 where fiber materials with a low elasticity modulus are to be used. In the embodiment of FIG. 13 the supporting body 12 is provided with longitudinal slots 65 distributed over the circumference of the body. These longitudinal slots 65 reduce the tangential stress in the supporting body 12 to zero and the radial forces in the strips 66 remaining between these slots 65 are taken up by the inner fiber winding of the flywheel type cylinder 13, whereby the tangential stress in the inner fiber windings is somewhat increased. Windings 67 must be extended into part 15 and cover slots 65. The winding 67 may be made of the same preimpregnated fibrous material as is used for the cylinder 13, whereby the supporting body 12 of FIG. 13 will have the same strength characteristics as the non-slotted hollow supporting body of the embodiment of FIG. 7. During the operation of the storage device 11 in FIG. 13, the shearing load and the torsion shearing are transmitted through the resin, and the strips 66 take up the bending loads. FIG. 14 shows a section, according to line XIV—XIV in FIG. 13, whereby the advantageous construction of the slotted hollow cylinder 14 is clearly visible.

FIG. 15 illustrates stress load curves from an energy storing device with a slotted supporting body 12 as shown in FIGS. 13 and 14. The illustration of FIG. 15 takes into account the following materials and a rotational speed $n = 20,000$ rpm.

Steel supporting body with $\delta$ult.$= 12,000$ daN/cm$^2$;
S-type glass fibers with $E = 0.74 \times 10^6$ daN/cm$^2$, $\gamma = 2.48$ g/cm$^3$ and $\delta$ult.$= 30,000$ daN/cm$^2$;
Synthetic resin Erla 4617/DDM with $E = 48,000$ daN/cm$^2$,
$\gamma = 1.24$ g/cm$^3$, $\delta$ult.$= 1,310$ daN/cm$^2$.

In tracing the stress curves in FIG. 15 only the areas in the center of the cylinder 13 were taken into account because the stresses are always somewhat larger in this area, please compare the stress curves 51, 54 and 57 in FIG. 12 relating to the series 53 of the TRIAX-6-element. FIG. 15 shows the following curves. Curve 68 illustrates the tangential stresses of the glass fibers. Curve 69 illustrates the tangential stresses of the resin. Curve 70 illustrates the radial stresses of the resin. The straight line 58 again represents the ultimate strength of the resin of the type "Erla 4617". It is seen that due to the radial forces in the strips 66 remaining between the slots 65, the tangential stress 68 is increased for the inner fiber windings relative to the non-slotted supporting body. However, this increase does not at all reach the ultimate strength of the glass fibers. Further it is interesting, that the curve 70 of the radial loads in the resin merge into the pressure range due to the centrifugal forces in the slotted supporting body. This advantageous feature causes an overall reduction of the radial tensional loads in the resin, whereby a higher load of the flywheel type energy storing device and accordingly a higher energy density has been made possible.

It is possible to keep the critical rotational speed or rpm well below the maximum rpm by using "aromatic" fibers, such as Kevlar 49 or S-type glass fibers for constructing the winding 13 if the cylinder has a substantial structural length. If it should not be possible to operate at rotational speeds above the critical level, it is possible to arrange layers of carbon fibers as shown in FIGS. 13 and 14, whereby the fibers extend in the axial direction 71 and has a ring in the area of the outer radial windings. By the use of these carbon fibers which have a high elasticity modulus, a large inertia moment is achieved as well as an improved flexural resistance or stiffness due to the high elasticity modulus. The additional load of the outer radial glass fibers by the axially arranged carbon fibers does not have any troublesome effects because the radial stresses diminish quickly in the outward direction as may be seen from curve 70 in FIG. 15.

Figure 16:
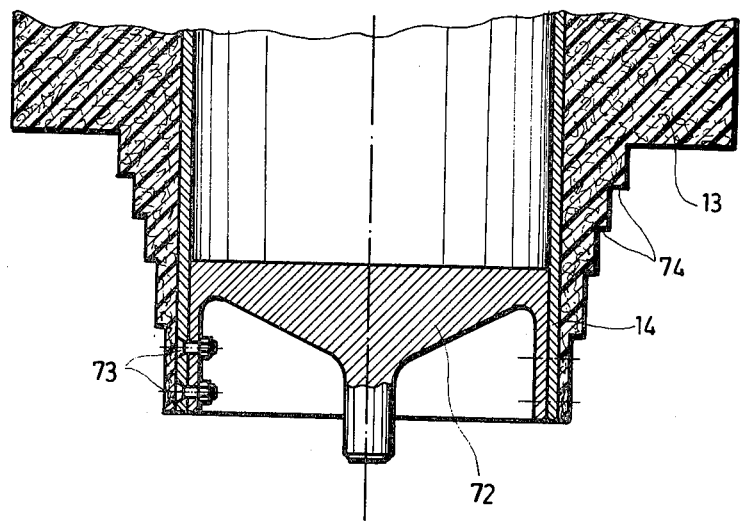
FIG. 16 shows a section through an end portion of a device according to the invention with one type of transitionary or intermediate member.
Figure 17:
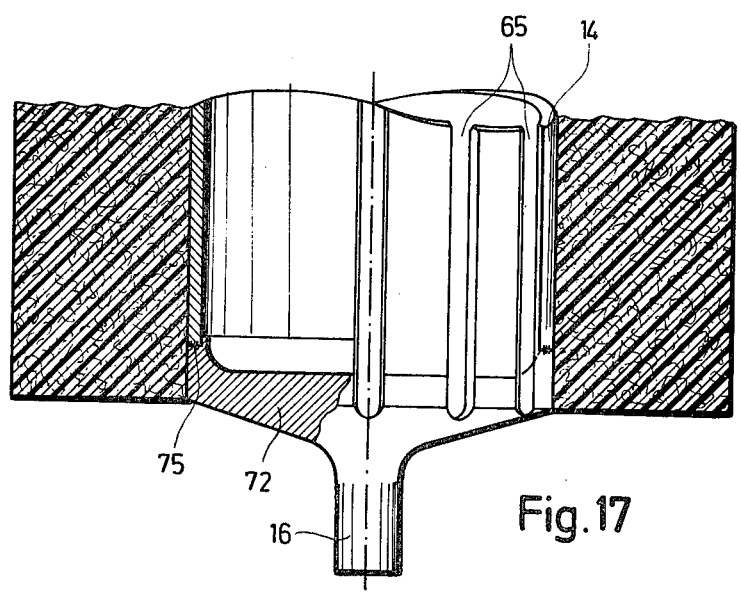
FIG. 17 illustrates another type of intermediate end member for a storage device according to the invention.

FIGS. 16 and 17 illustrate end members for the energy storing devices in which differently shaped or constructed intermediate members are inserted into the hollow cylinder 14. In FIG. 16 a flange type intermediate member 72 is inserted into the hollow cylinder 14. The member 72 is secured to the hollow cylinder 14 by means of counter sunk screws 73 distributed around the circumference. The flywheel cylinder 13 may have a stepped configuration 74, whereby the steps, depending on the occurring forces, may extend all the way to the end of the hollow cylinder 14. FIG. 17 illustrates a hollow cylinder 14 with slots 15 which is also provided with a flange type intermediate member 72 secured to the hollow cylinder 14 by means of a welding seam 75 extending all around the cylinder. The slots 65 extend also into the intermediate member 72 similarly to the illustration of FIG. 13.

It is not necessary to use materials of the described fiber thread, synthetic resin combination for the supporting body and/or for the flywheel masts. This applies to the nonslotted type of construction of the energy storing device 11 shown in FIGS. 7 and 16 as well as for the slotted type of construction of the supporting body 12 as shown in FIGS. 13 and 17. For example, it is possible to achieve substantially higher energy densities by using a titanium supporting body which is provided with a flywheel type cylinder made of linked single crystal threads, for example, of silicone carbides. Calculations in accordance with the NASTRAN program have shown that the rotational speed may be increased to approximately 40,000 rpm where slotted steel supporting bodies are used if synthetic resins could be employed which have the same density (specific gravity) and the same ultimate strength as "Erla 4617/DDM" but which has an elasticity modulus which is 10 times lower. These modifications which would require materials yet to be developed for the energy storing device are nevertheless within the present disclosure.

In another embodiment the flywheel type cylinder 13 may be constructed from threads, all of which are made of the same fiber material or the thread may be made from mixed fiber material. Tests have been made with a flywheel type cylinder made of a mixed yarn including carbon fibers, for example, known as "Thronel 100" and "aromatic" fibers, for example, known as "PRD 49" showing that with an increasing proportion of carbon fibers in the outer windings it is possible to use epoxy resins which are frequently combined with these fibers due to the increasing elasticity modulus. This type of construction results in an even higher energy density for the entire flywheel type energy storing device.

Figure 18:
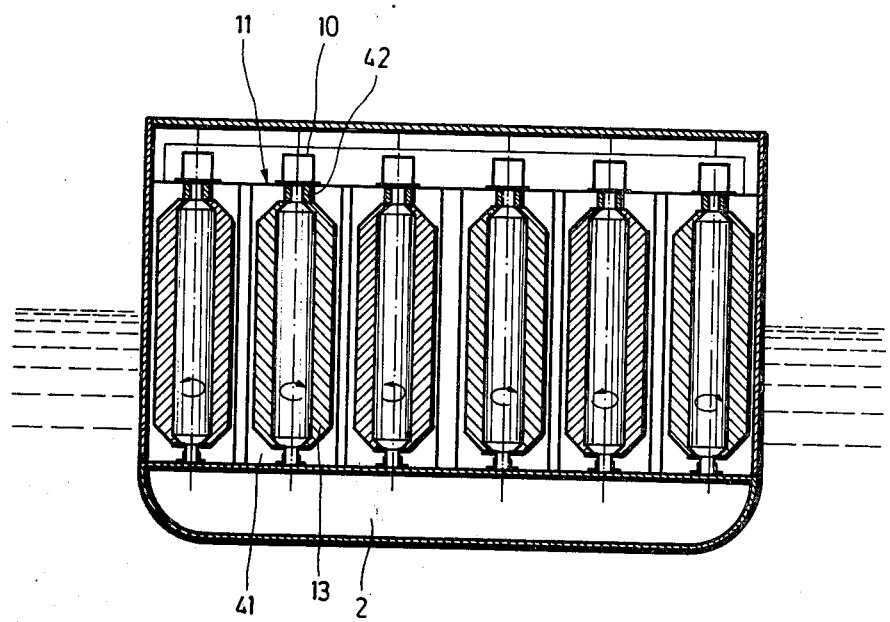
FIG. 18 shows a sectional view through the body of a floating craft or raft to illustrate the arrangement of the energy storing devices.

FIG. 18 shows one example how the storing devices could be arranged inside the freight space of a vessel 2 in a space saving manner. For example, six storing devices 11 are arranged in a row extending across the beam of the vessel and the devices are supported in a vertical position. The cylinders 13 rotate, preferably in a substantially evacuated housing 41 and their weight is taken up by axially effective magnetic bearings 42. The upper ends of the bearing shafts are connected to the motor-generator units 10 which may operate either as a motor or as a generator. The cylinders 13 are arranged in pairs, whereby the adjacent cylinders 13 forming a pair of rotating opposite directions to compensate any possible gyro moments. In a realistic loading space of a vessel 2 having a width of 50 meters and a length of 400 meters, it is possible to arrange 288 energy storing devices 11 in the manner shown in FIG. 18. Each of these rollers 13 would have a diameter of 7 meters and a length of 20 meters.

FIG. 19 illustrates another arrangement of the energy storing devices 11 in a horizontal position for the purpose of storing energy as well as for use as a propulsion unit for example, for vehicles and vessels. Two vacuum cylinders 83 which are stiff against torsion are supported in pairs by flanges 84 providing bearings for the bearing pins 16 of the devices 11. The vacuum cylinders 83 hold two such devices 11 supported with their bearing pins 16 in the flanges 84 as mentioned above, whereby one end is connected to motor-generator units 85 which may operate as electro-motors or as electric generators. Gyro forces onto a vehicle are eliminated by the flywheel installation shown in FIG. 19.

FIG. 20 shows a way for cooling the energy storage devices according to the invention. Such cooling is greatly facilitated by the type of structure disclosed herein, having a thin walled hollow cylinder acting as a supporting body. The inner hollow space of the supporting body 12 is filled with a cooling liquid 76 which may flow through the inlet and outlet bores 16a in the bearing pin 16. The spring loaded valves 77 are installed at both ends of the bearing pins 16. The valves 77 prevent the escape of the cooling liquid 76 from the bores 16a. The cooling liquid which rotates with the device 11 also contributes to storing energy thus performing two functions simultaneously and contributing to the increase of the storing capacity of the entire unit.

The temperature of the cooling liquid 76 may be continuously monitored by means of an infrared sensor 78. When the cooling liquid 76 reaches a predetermined temperature, the sensor 78 will cause a clutch 80 installed in the cover member 79 to engage the bearing pin 16, whereby the clutch 80 will simultaneously assure a sealing of the members to be coupled. The clutch 80 is connected to a reservoir for the cooling liquid. The reservoir itself is not shown, however, cooled down cooling liquid 76 may be supplied under pressure in the direction of the arrow 81 into the supporting body 12, for example, by means of a pump, whereby a further clutch not shown is secured to the upper bearing pin 16 for returning the heated-up cooling liquid back into the reservoir in a closed circuit. FIG. 20 further illustrates a rotor 82 installed on the lower bearing pin 16 which rotor may operate as a motor or generator as desired.

In the light of the above disclosure it will be appreciated that the flywheel type rollers or cylinders, according to the invention, will be manufactured in an economical and practical way by preferably using a special combination of "aromatic" fibers such as "Kevlar 49" (manufactured by A. E. Du Pont) with carbon fibers and epoxy resins. The above mentioned energy density is a measure for the storing capacity of the present energy storing devices. The energy density E/G of a flywheel type energy storing device is proportional to the so-called breaking length:

$$\frac{\sigma}{\gamma} = \frac{\text{material strength}}{\text{material density}^*}$$

*weight/volume of the material used for the energy storing. The theoretical value $E/G = 1.0\ \delta/\gamma$ can be achieved only for flywheel type rings which are infinitely thin. For the hollow cylinders, according to the invention, with a ratio of 1.5 of the outer diameter to the inner diameter it may be assumed as a good approximation that $E/G$ corresponds to $0.5\ \delta/\gamma$.

In order to calculate the achievable energy density of a flywheel type cylinder made of "aromatic" fibers the following starting values are assumed which have been confirmed by practical tests:

Type of fibers: "aromatic" fibers "Kevlar 49": $\delta\text{ult.} = 36{,}000$ daN/cm², fiber proportion in a lamination with epoxy resin 67%, specific gravity of the lamination $\gamma = 1.5$ g/cm³, safety factor 1.25, housing and bearing factor 1.2.

With the foregoing values the energy density is calculated as follows:

$$\frac{E}{G} = \frac{0.67 \times 36{,}000}{1.25 \times 1.2 \times 0.0015} = 5.36 \times 10^6 \text{cm}.$$

Comparing the foregoing with crude oil having a 10,000 kcal/kg heating value and assuming an efficiency factor of 0.2 we obtain an energy density of:

$$E/G = 85.4 \times 10^6 \text{ cm}$$

for the crude oil. Therefore, the following ratio between crude oil and the present energy storing device applies:

$$\frac{E/G \text{ crude oil}}{E/G \text{ flywheel}} = \frac{85.4 \times 10^6}{5.36 \times 10^6} = 16.0$$

Crude oil may be used as a source of energy but once. If we assume that an equivalent flywheel cylinder has an operational life of only 10 years, a ten times better utilization is achieved for the present device than for crude oil, provided sixteen energy transports are made per year with a vessel constructed as taught herein. Further comparisons have been made of the energy densities achieved with energy storing devices constructed from "aromatic" fibers and other energy storing devices. Thus, the energy density achieved with fiber storing devices as described herein is six times better than that of flywheels made of comparable high strength steel. The energy density of the present devices compared to that of lead batteries is four times better. A comparison of the present device with the energy density of a reservoir lake having a water column of 100 m is also rather interesting because heretofore the only possibility of storing large energy quantities was by means of a water reservoir. The respective ratio is as follows:

$$\frac{E/G \text{ flywheel}}{E/G \text{ water}} = \frac{5.36 \times 10^6}{100 \times 10^2} = 536.$$

It will be noted that the energy density of the present type of flywheel storage device is 536 times better than that of conventional water reservoirs.

The flywheel type energy storing devices disclosed herein may be installed in vessels having the size of modern day tanker ships. For this purpose, it would be possible to modify presently idle tankers. Such a modified tanker could carry approximately 200,000 tons of flywheel mass, thereby being capable to transport $29{,}200 \times 10^6$ watt hours. If this energy is fed into an electrical power supply network within two days, a vessel according to the invention, would have an installed power of $N = 608$ megawatts (MW).

The above described arrangement of the flywheel type storage devices in evacuated housings and their support by axially effective magnetic bearings results in operation durations of up to six months without any energy losses worth mentioning.

The above described twin arrangement of two storing devices as shown in FIG. 19 has the advantage that any gyro moments will compensate each other. Moreover, this arrangement is especially suitable for a horizontal positioning to thus facilitate the operation of the drive propellers of a vessel. The compensation of the gyro moments result in a smooth drive of the vessel since vibrations are not transmitted to the vessel body proper. It will generally be sufficient to provide just two energy storing devices of the type disclosed herein for the drive of the vessels according to the invention, especially since advantageous utilization locations for the energy storing are available in the Atlantic Ocean. Assuming, for example, a round trip travel distance of 5,000 km between the German coast and a platform power station utilizing wind and wave energies in the North Atlantic, and assuming further an average travel speed of 10 km/h as well as a drive power of 3 MW, it would be necessary to provide an energy for the round trip corresponding to:

$$E = \frac{2 \times 2{,}500 \times 3}{10} = 1{,}500 \; MWh.$$

The travel time will thus correspond to:

$$\frac{2 \times 2500}{10 \times 24} = 21 \; days.$$

In view of the foregoing, it is seen that a vessel capable of transporting an energy of 29,200 MW will require only about 5% of that energy for propelling the vessel.

Incidentally, the vessels according to the invention, are not only suitable for the energy collection and storage, they may also be used for the utilization of the collected energy.

For example, it would be possible to equip such a vessel or raft with an aluminum manufacturing plant or with a plant for making high alloy steels. In this context the required raw materials are available from countries to which the distance from the energy collecting location is relatively short. Accordingly, the transportation of such raw materials to the place of utilization would not involve any efforts beyond those presently employed.

Although the invention has been described with reference to specific example embodiments, it will be appreciated, that it is intended to cover all modifications and equivalents within the scope of the appended claims.

What is claimed is:

1. A vessel for gathering natural energy available in or on the oceans and for delivering the gathered energy in a port, comprising floating means, natural energy gathering means installed on said floating means, energy storing means installed in said floating means, said energy storing means comprising a plurality of flywheel type energy storing devices, motor-generator means, means operatively interconnecting said motor-generator means to said flywheel type energy storing devices and to said energy gathering means, said flywheel type energy storing devices comprising hollow cylinder means including a supporting body and flywheel roller means on said supporting body, said flywheel roller means comprising winding means made of resin impregnated fiber material, said natural energy gathering means driving said motor means for charging up said flywheel type energy storing devices when said vessel is on the ocean, said flywheel type energy storing devices driving said generator means for delivering the stored energy into a power supply network upon arrival of the vessel in a delivery port.

2. The apparatus of claim 1, wherein said hollow cylinder of the supporting body has thin walls.

3. The apparatus of claim 2, wherein said floating means comprise two vessels arranged in catamaran fashion, deck means covering said two vessels, and means interconnecting said vessels and said deck means in rigid, permanent or releasable manner.

4. The apparatus of claim 1, wherein said energy gathering means comprise solar energy converting means, wind energy converting means, wave energy converting means and heat energy converting means.

5. The apparatus of claim 4, wherein said solar energy converting means comprise solar cells for the direct conversion of solar energy into electric energy for driving said generator means.

6. The apparatus of claim 4, wherein said solar energy converting means comprise collectors for the solar energy for heating a liquid, said motor generator means including steam turbine means driven by said heated liquid.

7. The apparatus of claim 4, wherein said wave energy converting means comprise water driven turbines, elevated water storage means, pump means, floating means, lever means operatively interconnecting said floating means to said pump means for pumping water into said elevated water storage means, said water turbine means being operatively connected to said elevated water storage means for driving said generator means.

8. The apparatus of claim 4, wherein said wind energy converting means comprise wind rotors operatively connected to said generator means.

9. The apparatus of claim 4, wherein said means for converting heat energy comprise heat pumps arranged for extracting the heat of the sea water, said heat pumps comprising heat exchangers, means supporting said heat exchangers for immersion into the surface waters of the ocean, said heat pumps further comprising cooler means supported for immersion into deeper water layers, said heat energy converting means further comprising turbine means and means for driving said turbine means, which in turn drive said generator means.

10. The apparatus of claim 9, wherein said heat exchanger is capable of operation as an air cooler and wherein said cooler means are arranged for transferring the sea water heat to the medium of the heat pump.

11. The apparatus of claim 4, wherein said wind energy converting means comprise wind rotors and tubular masts supporting said wind rotors, said tubular masts being arranged along the sides of the deck means.

12. The apparatus of claim 1, wherein said hollow cylinder supporting body of the flywheel roller means has a length and diameter such that the ratio of length to diameter is at least one, said supporting body further comprising end members secured to the ends of said supporting body, and journal pins secured to said end members, said flywheel roller means with the fiber material winding means thereon having a strain characteristic corresponding substantially to the respective strain characteristic of said hollow cylinder supporting body.

13. The apparatus of claim 12, wherein said flywheel roller means have a diameter corresponding to about 1.5 to about 2.0 times the diameter of said hollow cylinder supporting body.

14. The apparatus of claim 12, wherein said hollow cylinder supporting body is made of titanium and wherein the flywheel roller means are made of synthetic resin impregnated carbon fibers or linked single crystal threads.

15. The apparatus of claim 12, wherein said hollow cylinder supporting body comprises axial slots extending into said end members.

16. The apparatus of claim 15, wherein said hollow cylinder supporting body is made of steel or titanium and the flywheel roller means are made of synthetic resin impregnated fibers of carbon, S-type fiber glass or "aromatic" fibers.

17. The apparatus of claim 16, wherein said flywheel roller means are made of synthetic resin impregnated mixed fibers, including carbon fibers and "aromatic" fibers, whereby the proportion of carbon fibers increases radially outwardly.

18. The apparatus of claim 12, wherein said flywheel roller means comprise a number of ring shaped layers of axially arranged carbon fibers.

19. The apparatus of claim 18, wherein said ring shaped layers of axially arranged carbon fibers are located near the outer diameter of the flywheel roller means.

20. The apparatus of claim 12, wherein said end members comprise hollow cones, said journal pins being secured to said hollow cones.

21. The apparatus of claim 12, wherein said end members comprise flanges inserted into said hollow cylinder supporting body.

22. The apparatus of claim 12, wherein said flywheel roller means are arranged on the cylindrical portion of said hollow cylinder supporting body.

23. The apparatus of claim 12, wherein said fiber material winding means also extend at least partially onto said end members.

24. The apparatus of claim 12, wherein said end members and said journal pins are constructed to enclose hollow spaces, said apparatus further comprising means for flowing a cooling medium into said hollow cylinder and into said hollow spaces wherein the cooling medium may flow through said hollow cylinder and hollow spaces.

25. The apparatus of claim 1, further comprising vacuum housings in which said flywheel type energy storing devices are located, and axial magnetic bearing means for supporting said flywheel type energy storing devices in said vacuum housings, said hollow cylinder supporting body comprising bearing shafts, and means interconnecting said bearing shafts to said motor-generator means, said motor means being driven by energy gathered by said energy gathering means, said generator means being driven by said flywheel type energy storing devices.

26. The apparatus of claim 1, wherein at least two oppositely rotating flywheel type energy storing devices are used for generating the power for propelling vehicles and vessels.

27. A vessel for gathering and mechanically storing natural energy available in or on the oceans and for transporting the gathered and stored energy to a delivery point, comprising floating means, natural energy gathering means installed on said floating means, energy storing means installed in said floating means, said energy storing means comprising a plurality of flywheel type energy storing devices, motor-generator means, means operatively interconnecting said motor-generator means to said flywheel type energy storing devices and to said energy gathering means, whereby said natural energy gathering means drive said motor means for mechanically storing the gathered energy by charging up said flywheel type energy storing devices when said vessel is on the ocean, and wherein said flywheel type energy storing devices drive said generator means for converting the mechanically stored energy into electric energy upon arrival of the vessel at said delivery point.

* * * * *